June 12, 1956  W. R. AIKEN  2,750,500
LINEAR PULSE INTEGRATOR
Filed Sept. 6, 1951
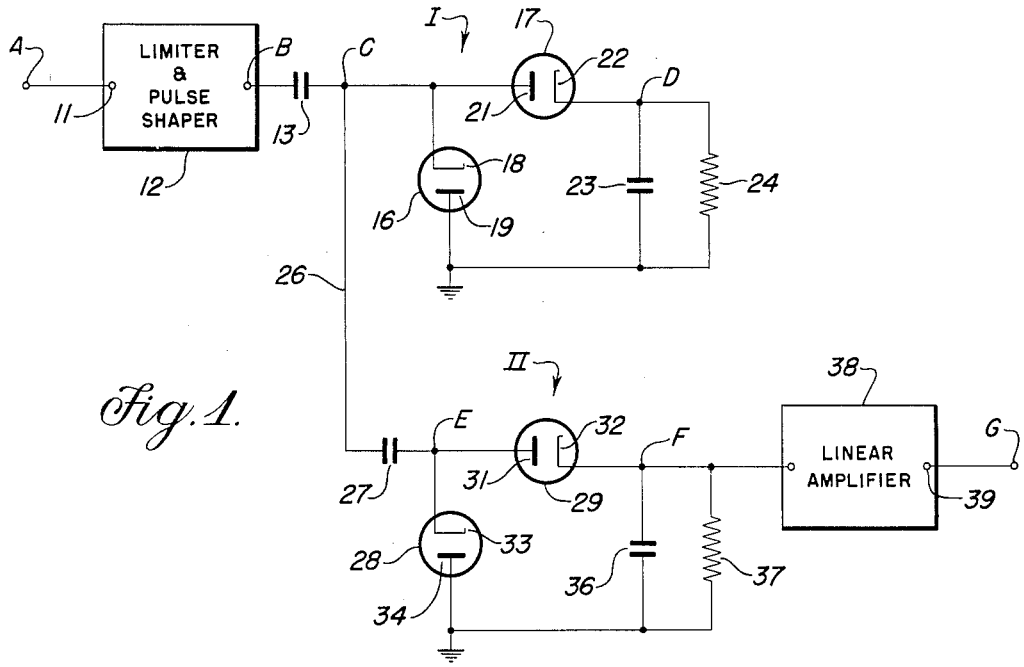
Fig. 1.
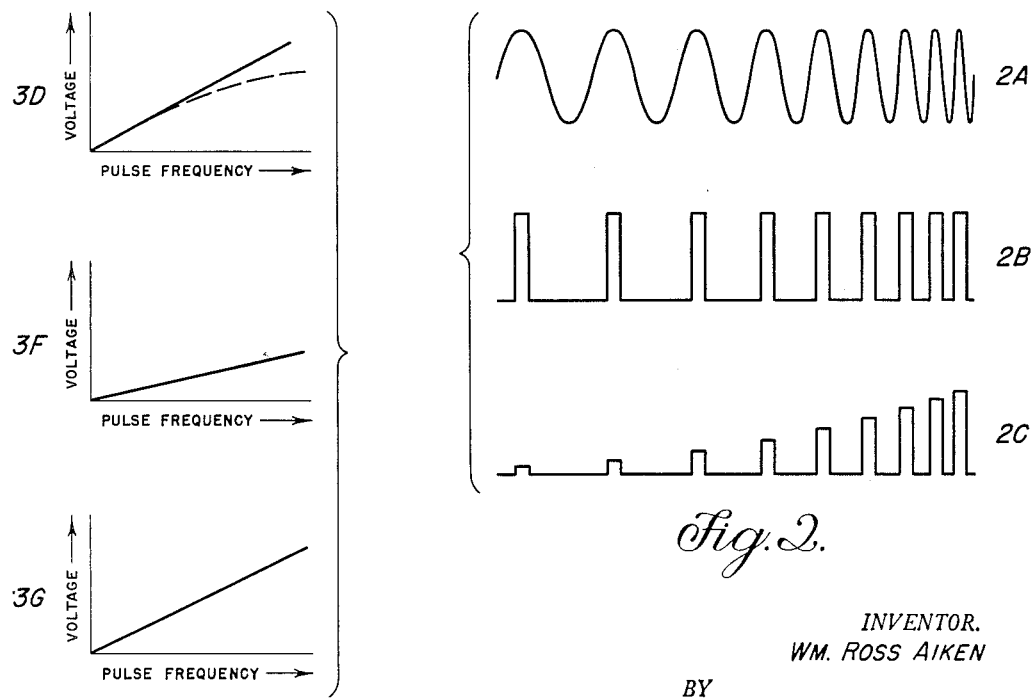
Fig. 2.
Fig. 3.
INVENTOR.
WM. ROSS AIKEN
BY
Roland A. Anderson
ATTORNEY.

United States Patent Office 2,750,500
Patented June 12, 1956

2,750,500
LINEAR PULSE INTEGRATOR
William Ross Aiken, Berkeley, Calif., assignor to the United States of America as represented by the United States Atomic Energy Commission Application September 6, 1951, Serial No. 245,358

4 Claims. (Cl. 250—27)

The present invention relates to an improvement in pulse integration and in particular to an improved method of same and circuit for producing an output voltage having a linear relation to input frequency, i. e., having an amplitude directly proportional to input pulse frequency over a wide pulse frequency range.

Pulse integrators are well known in the art and find wide application, as, for example, in frequency discriminators and counting circuits; however, difficulty is encountered in the use of conventional integrator circuits in that precise proportionality between input pulse recurrence rate and output voltage amplitude is quite difficult to obtain. This is particularly true where high frequency input pulses are encountered, for the energy storing means conventionally employed in this type of circuit opposes the complete integration of the pulses. For this and other reasons the output voltage becomes increasingly out of proportion to the input pulse frequency and errors of appreciable magnitude result.

It is therefore an object of the present invention to provide an improved linear pulse integrator.

It is another object of the present invention to provide an improved method of integrating high frequency pulses.

It is another object of the present invention to provide a novel and improved pulse integrator producing a voltage proportional to input pulse frequency over a wide range of input pulse frequency.

It is a further object of the present invention to provide an improved method and means for integrating high frequency pulses by providing double integration in that the unavoidable error of the first integration is integrated to produce the correct integrator signal.

Further objects and advantages of the invention will become apparent to those skilled in the art from the following description taken together with the accompanying drawing wherein:

Figure 1 is a diagram of an electrical circuit embodying the principles of the present invention;

Fig. 2 is a series of voltage time relationships showing voltage waves at designated points in the circuit of Fig. 1; and Fig. 3 is a number of graphs showing the variation of output voltage with input pulse frequency in the circuit of Fig. 1.

Considering now the elements and connections of the invention and referring to Fig. 1, it will be seen that an input terminal A is provided for connection to a pulse circuit whose signals are to be integrated. Connected to terminal A is the input 11 of a limiter and pulse shaper 12 which has its output terminal B connected to one side of a coupling capacitor 13. The opposite side of capacitor 13 is connected to input terminal C of integrator circuit I and which comprises a pair of diode vacuum tubes 16 and 17. Of these diodes, one has its cathode 18 connected directly to terminal C and its anode or plate 19 grounded. The other diode 17 has its plate or anode 21 connected to terminal C and its cathode 22 connected to a point D to which there is connected a grounded storage capacitor 23. There is also provided a bleeder resistor 24 which is connected across, or in shunt with, storage capacitor 23 and through which leaks the energy stored in capacitor 23. It will be noted that point D is the output terminal of integrating circuit I.

In addition to the above circuit, there is provided a second integrating circuit II which is connected through lead 26 to the input terminal C of circuit I, or between terminal C and capacitor 13. This second circuit II is coupled to the first by coupling capacitor 27 and includes a pair of diode vacuum tubes 28 and 29. The plate 31 of diode 29 is connected to the cathode 33 of diode 28 and to one side of coupling capacitor 27 at the input terminal E of circuit II and the plate 34 of diode 28 is grounded. The cathode 32 of diode 29 is connected at point F to one side of a storage capacitor 36 which has its other side grounded, and there is provided a bleeder resistor 37 connected across storage capacitor 36. Point F is, of course, the output terminal of circuit II.

The output of circuit II is taken from the cathode 32 of diode 29 or in other words across resistor 37, as the signal appears between the ungrounded side of resistor 37 and ground. To the output terminal F of circuit II there is connected a linear amplifier 38, described in more detail as to function in the following description of operation, and the output terminal 39 of linear amplifier is connected to the output terminal G of the linear pulse integrator.

Before proceeding to a description of the operation of the invention, it is to be noted that the illustrated embodiment of the invention includes two substantially identical circuits, I and II, capacitively coupled together, and equivalent elements of each are preferably identical except as noted below. It will, of course, be appreciated that the capacitance of storage capacitors 23 and 36 is much larger than the capacitance of coupling capacitors 13 and 27, as, for example, one hundred or one thousand times as much, and also the capacitance of capacitor 27 is smaller than the capacitance of capacitor 13.

As an aid to understanding the operation of the invention, there is included in Fig. 2 typical voltage waveshapes at various points in the circuit and these are identified by letter which appears at appropriate points in the circuit. Thus, for example, Fig. 2A is the waveshape of the signal at input terminal A and in the interest of simplicity the input signal is taken as a sine wave having a linearly increasing frequency; however, the input signal may have any other waveshape or frequency variation, with the limitation that individual pulses should have sufficient duration to charge capacitor 13 to the full voltage value of the pulse.

In addition to the illustration of waveshapes in Fig. 2, there is also illustrated in Fig. 3 the voltage-time relationships at three points in the system; namely, at D the output terminal of circuit I, at F the output terminal of circuit II and at output terminal G of the linear pulse integrator; these graphs being identified by letter which appear at the corresponding locations in Fig. 1.

Considering now the operation of the invention and referring to Figs. 1, 2, and 3, it will be seen that with a sine wave input signal having a linearly varying frequency, as shown at Fig. 2A, there is produced at the output terminal B of limiter and pulse shaper 12 square waves having individual separations corresponding to the respective sine wave alternations of the input signal, all as shown in Fig. 2B. These signals are passed by coupling capacitor 13 and are then applied to diodes 16 and 17 of circuit I. When the input signal is negative, diode 16 conducts by virtue of the negative voltage applied to the cathode 18 thereof and charges or discharges capacitor 13 to establish the proper zero or D. C. level. Thus this diode acts as a clamp or D. C. restorer. A positive voltage then applied to the anode 21 of diode 17 causes diode 17 to conduct and transfer a given amount of energy into storage capacitor 23. The charge on storage capacitor 23 leaks off through resistor 24 and for relatively low frequency input signals the voltage at D is proportional to the input signal frequency, as shown in the graph of Fig. 3D. Thus when it is desired to integrate relatively low frequency pulses a meter or other indicating means may be connected directly to the output terminal D of circuit I and a linear relationship will be obtained.

With a high frequency input signal, however, the positive voltage upon the cathode 22 of diode 17 from storage capacitor 23 becomes appreciable and biases diode 17 so as to prevent some of the pulse energy from passing into storage capacitor 23. The amount of energy per pulse not transferred to storage capacitor 23 increases as the frequency of the input signal increases and thus the proportionality or linearity between input signal frequency and voltage amplitude at D decreases, as shown by the solid line in Fig. 3D.

The voltage at coupling capacitor 13 is shown at Fig. 2C and represents the amount of each pulse not transferred to capacitor 23. It is clear from this illustration that the error in the first integrating circuit is included in these pulses (2C) which steadily increase in amplitude as the frequency of the input pulses is increased. In order to obtain a direct proportionality between the input pulse frequency and output voltage the present invention provides a second integrating circuit II coupled to the first through coupling capacitor 27 and operating upon the error signal of the first integrating circuit I. There is applied to the second integrating circuit II the residual voltage at coupling capacitor 13 as shown at Fig. 2C, and there thus appears at the input terminal E of the second integrating circuit a signal having an amplitude which increases with the error in circuit I. This signal causes circuit II to operate in the same manner as the first; i. e., diode 28 conducts when a negative wave appears at E and discharges capacitor 27 to the proper zero level and causes a positive voltage wave to be applied to the anode 31 of diode 29. This positive voltage causes diode 29 to conduct and charge storage capacitor 36. Although, like capacitor 13 in the first integrator circuit, capacitor 27 does not completely transfer all of the energy of each input pulse through diode 29 to the storage capacitor 36, the pulses applied to diode 29 are of increasing magnitude as they result from the error in the first integrating circuit and thus the residual charge of storage capacitor 36 is automatically compensated for, and the output voltage of the second integrator circuit is directly proportional to the frequency of the input signal. As the increase in the magnitude of the signal applied to the second integrator circuit results from the residual charge on the capacitor 13 of the first integrating circuit this increased magnitude is exactly the right amount to compensate for the residual charge on the storage capacitor 36 of the second integrator circuit when the two integrator circuits are identical. A graph of voltage versus frequency at the output of the second integrator is shown at Fig. 3F and it will be seen to be a linear relationship when the input signal frequency is linearly increasing, as assumed for purposes of illustration.

It will be appreciated that the magnitude of the signals applied to the second integrator circuit is smaller than that applied to the first integrator circuit and it may thus be desirable to amplify the output as by a linear amplifier 38. By this means a strong output voltage is obtained which is directly proportional to the input frequency as shown in Fig. 3G.

With a high frequency input signal the non-proportionality of circuit I steadily increases because of the increased voltage remaining on the cathode 22 of diode 17 which prevents diode 17 from completely discharging capacitor 13 during each cycle of input voltage. The resultant error is best noted in Fig. 3D wherein the solid line depicts the voltage at D of circuit I and the dotted line indicates the proper voltage for linearity. The voltage difference between the solid and dotted lines of Fig. 3D represents the error voltage of circuit I and corresponds to the signals on coupling capacitor 13 as shown in Fig. 2C. By integrating this error signal in a circuit subject to the same errors, a linear relationship results.

From the foregoing it is evident that the present invention provides an output voltage directly proportional to input signal frequency and may therefore be denominated as a linear integrator. The circuit complexity is minimized and, in fact, only standard integrating elements are required; however, the resultant integration is far superior to that of conventional integrators.

While the present invention has been described with respect to only a single embodiment, it will be apparent to those skilled in the art that numerous variations and modifications are possible within the spirit and scope of the invention and thus it is not intended to limit the invention except by the terms of the following claims.

What is claimed is:

1. A linear pulse integrator comprising a first circuit including a first diode vacuum tube with a grounded anode, a second diode vacuum tube having its anode connected to the cathode of said first diode vacuum tube, and a parallel connected resistance-capacitance combination connected between the cathode of said second diode vacuum tube and ground; an input terminal; a first coupling capacitor connected between said input terminal and said first circuit at the common anode-cathode connection thereof; a second circuit identical with said first circuit; a second coupling capacitor connected between the common anode-cathode connections of said first and second circuit and applying to said second circuit the error signal of said first circuit; and an output terminal connected to the ungrounded side of the resistance-capacitance combination of said second circuit.

2. A linear pulse integrator as claimed in claim 1 further defined by said first coupling capacitor having a larger capacitance than said second coupling capacitor and the capacitors in the resistance-capacitance combinations of said first and second circuits having a capacitance more than one hundred times the capacitance of said coupling capacitors.

3. A linear pulse integrator comprising an input terminal adapted to be connected to a pulsed circuit, a limiter and pulse shaper connected to said input terminal and producing signals of uniform amplitude and of a duration proportional to the input pulses, a first integrating circuit, a first coupling capacitor connecting said limiter and pulse shaper to said first integrating circuit, a second integrating circuit, a second coupling capacitor connecting said second integrating circuit to the connection of said first coupling capacitor to said first integrating circuit and impressing upon said second integrating circuit the signal on said first coupling capacitor not passed by said first integrating circuit, and a linear amplifier connected to the said second integrating circuit and producing a voltage having an amplitude directly proportional to the input pulse frequency.

4. A linear pulse integrator as claimed in claim 3 further defined by said first and second integrating circuits being identical and each comprising a first and second diode vacuum tube, the first of said vacuum tubes having its anode grounded and its cathode connected to the anode of said second vacuum tube, a storage capacitor connected between the cathode of said second vacuum tube and ground, and a resistor connected across said storage capacitor to discharge said capacitor at a controlled rate.

References Cited in the file of this patent

UNITED STATES PATENTS

| | | |
|---|---|---|
| 2,099,065 | Holden | Nov. 16, 1937 |
| 2,113,011 | White | Apr. 5, 1938 |
| 2,403,557 | Sanders | July 9, 1946 |
| 2,491,921 | Hepp | Dec. 20, 1949 |
| 2,491,922 | Hepp | Dec. 20, 1949 |
| 2,621,292 | White | Dec. 9, 1952 |